(No Model.)

J. MURPHY.
PACKING.

No. 516,874. Patented Mar. 20, 1894.

Witnesses:—
D. N. Hayward
Fred S. Kemper

Inventor.
John Murphy
by his Attorneys
Gifford & Daw

UNITED STATES PATENT OFFICE.

JOHN MURPHY, OF BROOKLYN, NEW YORK.

PACKING.

SPECIFICATION forming part of Letters Patent No. 516,874, dated March 20, 1894.

Application filed December 16, 1893. Serial No. 493,866. (No model.)

*To all whom it may concern:*

Be it known that I, JOHN MURPHY, of Brooklyn, county of Kings, and State of New York, have invented a new and useful Improvement in Packing, of which the following is a specification.

Figure 4:
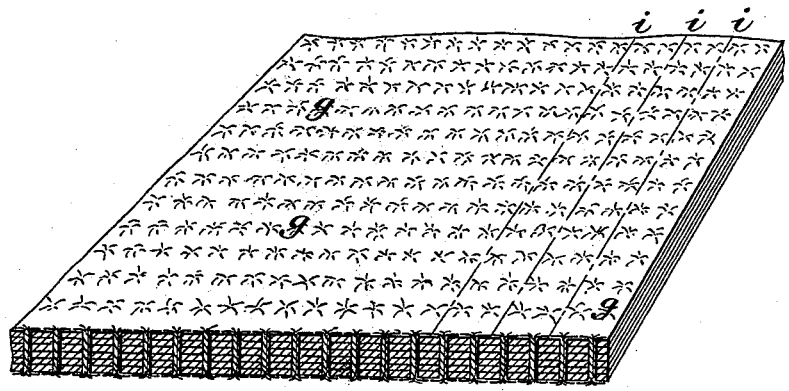
Figure 3:
Figure 2:
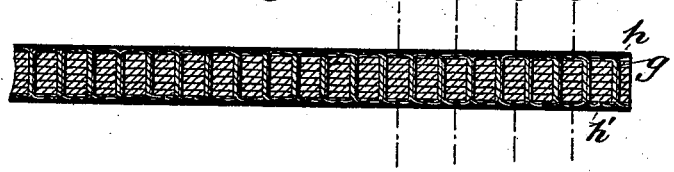
Figure 1:
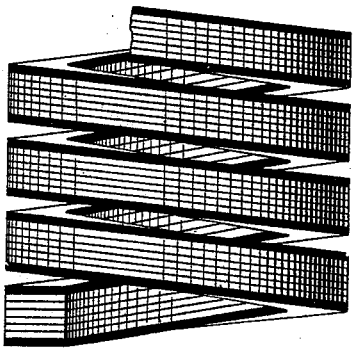

Figure 1 of the accompanying drawings shows the packing completed. Fig. 2 is a cross section of the material from which the packing is formed. Fig. 3 is a cross section at an earlier stage and Fig. 4 is an isometric view of the same.

In constructing my packing, I first take sufficient fibrous material of the kind which is ordinarily used in manufacturing packing, as for instance, duck, and having properly coated it on each side with the rubber I place a number of layers of it together in the ordinary manner and powerfully compress between rolls so that the various layers are made to adhere by the coating of rubber which they have received. In the drawings these layers are lettered $a$, $b$, $c$, $d$, $e$ and $f$. I then pass transversely through these layers, stays $g$ preferably coated by or run through a solution of rubber or rubber cement. I next pass the article between rollers where it is again strongly compressed and where the projecting ends of the stays $g$ are pressed down and embedded into the rubber coating of the duck, as shown in Fig. 4. I then place upon the exterior of the article shown in Fig. 4, the usual envelope $h$ $h'$ of rubber in the ordinary manner. The sheet of material thus formed, which is shown in section in Fig. 2, I next partially vulcanize leaving the vulcanization sufficiently incomplete, so that upon cutting strips from the material and coiling them and then completing the vulcanization, the completion of the vulcanization will give them a set in the coiled form. I next cut strips from the material, as for instance, on the lines $i$ which lines of cut I prefer to locate between the stays. Each of the strips thus produced I coil around the mandrel and complete the vulcanization of it while in the coiled form. The packing is then completed, as shown in Fig. 1 and is so set as to normally retain that coiled form.

The stays $g$ may be applied in various ways. Thus, they may be applied by sewing lines of stitching across the material after which the thread or cord or other material used in sewing may be cut at intervals between each strip or left without cutting. In Fig. 3 is shown a series of ordinary running stitches $j$, $j'$, $j^2$ which have not been cut and at another part a series of similar stitches $k$ $k'$ which have been cut. I prefer the cut form because I believe that the raw ends of the cord form a more secure union with the vulcanized rubber on opposite sides of the duck. Instead of the running stitches, machine stitches may be employed and for this purpose, I prefer to use the machine described in Patent No. 333,248, dated December 29, 1889; or instead of using any connected line of stitches at all, the stays might be separately inserted when, without the necessity of cutting, they would be represented by the stays $k$ $k'$ in Fig. 3. As the material for the stays, I prefer cotton or linen cord.

It will be observed that in my packing, the stays are applied to a sheet of the raw material before it is cut and before the application of the rubber envelope $h$ $h'$ and before vulcanization, so that the stays which connect the layers of textile material are secreted beneath the rubber envelope and are fixed in position by the vulcanization. It will also be observed that the vulcanization is performed in part before the material is coiled and therefore that the position of the stays is sufficiently secure by this partial vulcanization to prevent displacement under the strain of coiling. It will also be observed, however, that this is done without prejudice to the subsequent setting of the material including the stays in the coiled form by the completion of the vulcanization.

I claim—

1. As an article of manufacture, a coiled packing composed of interior layers of fibrous material and an exterior envelope of rubber, in combination with rubber intermediate the layers of fibrous material and stays beneath the rubber envelope whereby the union between the layers of fibrous material is reinforced; the bond between all said parts and the setting of the same in the coiled form being made by vulcanization, substantially as described.

2. The process for making coiled packing which consists in uniting sheets of fibrous material by rubber reinforced by transverse stays, then enveloping the same on each side by a sheet of rubber, then partially vulcanizing the same, then cutting the same up into strips, then coiling each of the strips and then completing the vulcanization, substantially as described.

JOHN MURPHY.

Witnesses:
WM. A. COLLINS,
J. J. MORRIS.